United States Patent
Light et al.

(10) Patent No.: US 7,280,642 B2
(45) Date of Patent: Oct. 9, 2007

(54) STATUS MONITORING SYSTEM UTILIZING AN RFID MONITORING SYSTEM

(75) Inventors: Elliott D. Light, Rockville, MD (US); Jon L. Roberts, Great Falls, VA (US)

(73) Assignee: Intellectual Ventures Fund 30, LLC, Las Vegas, NV (US)

( * ) Notice: Subject to any disclaimer, the term of this patent is extended or adjusted under 35 U.S.C. 154(b) by 333 days.

(21) Appl. No.: 11/123,490

(22) Filed: May 6, 2005

(65) Prior Publication Data

US 2005/0201543 A1      Sep. 15, 2005

Related U.S. Application Data

(63) Continuation-in-part of application No. 09/759,107, filed on Jan. 12, 2001, now Pat. No. 7,088,802, and a continuation-in-part of application No. 09/265,656, filed on Mar. 2, 1999, now Pat. No. 6,483,900, which is a continuation-in-part of application No. 08/963,373, filed on Oct. 20, 1997, now Pat. No. 6,175,616.

(51) Int. Cl.
*H04M 1/64* (2006.01)

(52) U.S. Cl. .................... 379/88.14; 379/88.12

(58) Field of Classification Search ........... 379/62.1, 379/69, 88.12, 88.17, 88.22, 90.01, 93.01, 379/201, 213, 88.14, 88.16
See application file for complete search history.

(56) References Cited

U.S. PATENT DOCUMENTS 3,989,899 A    11/1976    Norwich
4,166,929 A    9/1979    Sheinbein
4,335,682 A    6/1982    Gonda et al.
4,559,416 A    12/1985    Theis et al.
4,675,656 A    6/1987    Narcisse
4,734,931 A    3/1988    Bourg et al.
4,759,055 A    7/1988    Okumura et al.
4,792,796 A    12/1988    Bradshaw et al.
4,918,425 A    4/1990    Greenberg et al.
5,023,868 A    6/1991    Davidson et al.
5,054,428 A    10/1991    Farkus
5,062,147 A *  10/1991    Pickett et al. ................. 714/46
5,223,815 A    6/1993    Rosenthal et al.
5,353,744 A    10/1994    Custer
5,381,129 A    1/1995    Boardman
5,425,091 A    6/1995    Josephs (Continued)

OTHER PUBLICATIONS

Rob Harrill, "A watch that's smarter than you?", http://www.eurekalert.org/pub_releases/2004-10/uow-awt100604.php, Oct. 6, 2004.

(Continued)

*Primary Examiner*—Creighton Smith
(74) *Attorney, Agent, or Firm*—Greenberg Traurig, LLP

(57) ABSTRACT

A status monitoring system utilizing an RFID tag. In an embodiment of the present invention, a status of a receiving device comprises a device address, whether the device is able to receive communications from a sending device, and a recipient list of users able to use the receiving device at any particular time. In an exemplary embodiment of the present invention, the recipient list is created by the receiving device in response to the detection of a qualified user within a preset access distance of the receiving device. A sending device may access this status information and determine how to communicate with a user on the recipient list.

23 Claims, 9 Drawing Sheets

U.S. PATENT DOCUMENTS

| | | |
|---|---|---|
| 5,425,330 A | 6/1995 | Touchton et al. |
| 5,461,365 A | 10/1995 | Schlager et al. |
| 5,465,687 A | 11/1995 | Custer |
| 5,477,210 A | 12/1995 | Belcher |
| 5,500,893 A | 3/1996 | Onosaka |
| 5,530,740 A | 6/1996 | Irribarren et al. |
| 5,553,469 A | 9/1996 | Seidel |
| 5,605,116 A | 2/1997 | Kim et al. |
| 5,608,786 A | 3/1997 | Gordon |
| 5,642,690 A | 7/1997 | Calabrese et al. |
| 5,646,593 A | 7/1997 | Hughes et al. |
| 5,647,002 A | 7/1997 | Brunson |
| 5,781,102 A | 7/1998 | Huang |
| 5,857,433 A | 1/1999 | Files |
| 5,868,100 A | 2/1999 | Marsch |
| 5,939,988 A | 8/1999 | Neyhart |
| 5,943,399 A | 8/1999 | Bannister et al. |
| 5,977,913 A | 11/1999 | Christ |
| 6,011,471 A | 1/2000 | Huang |
| 6,075,443 A | 6/2000 | Schepps et al. |
| 6,166,635 A | 12/2000 | Huang |
| 6,169,484 B1 | 1/2001 | Schuchman et al. |
| 6,405,132 B1 | 6/2002 | Breed et al. |
| 6,412,813 B1 | 7/2002 | Breed et al. |
| 6,529,131 B2 | 3/2003 | Wentworth |
| 6,577,238 B1 | 6/2003 | Whitesmith et al. |
| 6,600,422 B2 | 7/2003 | Barry et al. |
| 6,686,881 B1 | 2/2004 | Lu et al. |
| 6,687,609 B2 | 2/2004 | Hsiao et al. |
| 6,720,920 B2 | 4/2004 | Breed et al. |
| 6,820,897 B2 | 11/2004 | Breed et al. |
| 6,837,427 B2 | 1/2005 | Overhultz et al. |
| 6,917,291 B2 | 7/2005 | Allen |
| 2002/0198632 A1 | 12/2002 | Breed et al. |
| 2003/0233189 A1 | 12/2003 | Hsiao et al. |
| 2004/0180646 A1 | 9/2004 | Donley et al. |

OTHER PUBLICATIONS

Suresafe Technology, Inc. Product Description, http://www.suresafe.com, Feb. 8, 2005.

TrackIT Corp. Product Description; "Mobile Security Goes High Tech", http://www.trackitcorp.com, Feb. 8, 2005.

* cited by examiner

STATUS MONITORING SYSTEM UTILIZING AN RFID MONITORING SYSTEM

CROSS REFERENCE TO RELATED APPLICATIONS

This application is a continuation in part application of application Ser. No. 09/759,107 filed Jan. 12, 2001, now U.S. Pat. No. 7,088,802 which is a continuation in part of application Ser. No. 08/963,373, filed Oct. 20, 1997, now U.S. Pat. No. 6,175,616 and a continuation in part of application Ser. No. 09/265,656, filed Mar. 2, 1999, now U.S. Pat. No. 6,483,900. The Ser. Nos. 09/759,107, 09/265, 656, and Ser. No. 08/963,373 applications are incorporated herein by reference, in the entirety, for all purposes.

BACKGROUND

This invention relates generally to electronically determining the status of a telephone or other device over a network. More specifically, the present invention provides a method and apparatus for obtaining the status of a called device and providing the status information to a calling device.

Literally millions of times per day, parties attempt to contact one another, only to find that the device initiating the telephone call receives a busy signal or is put into the phone mail of the receiving telephone when that telephone is off-hook. Not only is this experience frustrating for the caller, but can result in lost business or social opportunities on the part of the receiving device that is on the line speaking with someone else. In addition, receiving busy signals and the inability to complete telephone calls results in the loss of millions of dollars in revenue both from the time expended by the caller in trying to reach the desired device, as well as lost opportunities for commerce or other social contact.

Telephone line activity monitoring has been the subject of invention in the past. For example, U.S. Pat. No. 4,559,416 to Theis, et. al. describes a form of line activity monitoring for the purpose of obtaining information regarding statistics of line usage. This system detects the usage of the line, but not transmit status information to others in any current fashion.

U.S. Pat. No. 3,989,899 to Norwich describes yet another monitoring system whose purpose is to notify an operator that a telephone line is open so that a desired message can be delivered by the operator to a receiving party. This system comprises an automatic dialer which attempts to reach individuals on a repetitive basis until a connection is made. Again, status of the telephone at any given point of time is not provided.

U.S. Pat. No. 4,734,931 to Bourg, et. al. describes an integrated calling directory comprising a personal computer that stores information about the numbers being called. It does not address the problem associated with the called party telephone being in an off-hook condition. This is not reported in any fashion to the initiator of the telephone call.

U.S. Pat. No. 5,530,740 to Irribarren, et. al. described a communication system comprising a voice message system for storing and retrieving voice messages and faxed data and for converting text into voice messages. This system does not deal with the issue of how to contact the party receiving the phone call but only leaves a message for that party in the event that the phone is in an off-hook condition.

U.S. Pat. No. 5,500,893 to Onosaka is yet another information processing system having a telephone and an informational processing device. Again this invention does not address the issue of whether a called party telephone is in an on-hook or off-hook condition.

U.S. Pat. No. 5,647,002 to Brunson describes a system for synchronization of mail boxes over a network. This system is designed to ensure that information in electronic mail is complete in a series of different mail boxes. The issue of providing information to a caller regarding the status of a called party's telephone is not dealt with.

What is desired is a system whereby a calling device can pre-determine the status of a called device so as to maximize the opportunity for establish communications between those devices.

SUMMARY

In an embodiment of the present invention, a status of a receiving device comprises a device address, whether the device is able to receive communications from a sending device, and a recipient list of users able to use the receiving device at any particular time. In an exemplary embodiment of the present invention, the recipient list is created by the receiving device in response to the detection of a qualified user within a preset access distance of the receiving device. A sending device may access this status information and determine how to communicate with a user on the recipient list.

For the purposes of this application, a sending device may be device that initiates communications to a receiving device, or it may be a device that routes, brokers, or proxies those communications. By way of illustration, if a receiving device is a telephone, a computer, or a digital telephone (VoIP) gateway, a sending device may be another telephone, another computer computer, another VoIP gateway, a switch, or a PBX.

As will be appreciated by those skilled in the art, the status and the communications may be provided over wired, wireless, RF, optical, or other media or networks comprising segments of differing transmission media.

According to an exemplary embodiment of the present invention, a user is associated with an RFID tag that is queried by a receiving device. The query signal is received by RFID tag and reflected back to the receiving device. The reflected signal comprises a tag identifier code stored in memory of the RFID tag. The receiving device associates a qualified user with user information and with a tag identifier code. The receiving device communicates its device address and selected user information to the sending device or to a file accessible to the sending device. The sending device can then direct calls to the qualified user to the address of the receiving device. Because the RFID tag identifier is unique, a receiving device can maintain a recipient list comprising a plurality of qualified users and direct communications to them accordingly.

In an alternate embodiment of the present invention, the recipient list is generated and maintained by a standalone recipient detection system. The standalone recipient detection system generates a status file comprising identifying information of the receiving device to which it is associated and a recipient list. The status file is directed to, or accessible by, a sending device.

In still another embodiment of the present invention, the status of the receiving device is available to only certain sending devices or to certain senders. In this embodiment, a communication from a calling device or a sender to a recipient of the communication is forwarded to the sending device proximate to the recipient if the calling device or sender has been pre-qualified to use the status information of receiving device.

It is therefore an aspect of the present invention to maximize the probability that a sending device will actually contact a user of a receiving device when a communication is initiated.

It is a further aspect of the present invention to provide a status of the receiving device—whether it is in use, available for communication, muted—before the sending device attempts to communicate with the receiving device.

It is a further aspect of the present invention to provide device status information over a network.

It is a further objection of the present invention to continually monitor the status of a device order to provide the device status information desired.

It is a further aspect of the present invention to incorporate the device status, user information, and recipient lists in a file that can be accessed by others.

It is a further aspect of the present invention to constantly update device status, user information, and recipient lists files so that callers accessing the files can have an up-to-date record of the status of a device to be called.

It is a further aspect of the present invention to obtain the status of a receiving device over a cable system connected to public switched telephone network.

It is yet another objection to obtain the status of a receiving device when both the receiving device and the sending device are connected to cable systems.

It is a further aspect of the present invention to obtain the status of a receiving device when the receiving device is connected to a cable system but the sending device is not.

It is yet another aspect of the present invention to generally provide information concerning home and office equipment and functions to a file that can be accessed by networks external to the home, such as the Internet.

These and other aspects of the present invention will become apparent from a review of the general and detailed descriptions that follow. The present invention provides a method for a sending device to receive constantly updated information concerning the status of a receiving device. For purposes of this specification this status will generally be receiving the "telephone status." The present invention also provides a way for a sending device to leave e-mail and voice mail to the receiving device as part of the determination of telephone status.

In an embodiment of the present invention, a system for obtaining status of a receiving device over a network comprises equipment adapted to provide output signals indicative of the status of the receiving device, a status file, a first network, a second network, and a sending device. The receiving device comprises an address for receiving communications. By way of illustration and not as a limitation, the receiving device may be a telephone, and wherein the signals indicative of the status of the receiving device comprises off-hook signals from the telephone if the telephone is off-hook. In an embodiment, the user address and the receiving device address are telephone numbers. However, this is not meant as a limitation. Other addressing systems may be used without departing from the scope of the present invention.

The status file is connected to the equipment and to the first network and receives the output signals from the equipment. The sending device is connected to the first network and comprises instructions for accessing the status file over the first network and for obtaining the status of the receiving device. By way of illustration and not as a limitation, the status file comprises the off-hook status of a telephone if the of telephone is off hook and the on-hook status of a telephone if the telephone is on-hook. The status comprises a user identifier of a potential user of the receiving device determined to be within a preset access distance of the receiving device.

According to embodiments of the present invention, the first network is selected from the group consisting of a wired network, wireless network, a fiber network, hybrid fiber coax network, a switched network, a packet-based network, a cable network, a public switched telephone network, and the Internet. According to other embodiments of the present invention, the receiving device is selected from the group consisting of a telephone, a computing device, a digital telephone adapted to provide voice over IP, a digital telephone adapted to provide voice over a packet switched network, a personal data assistance, a cell phone, a radio phone, and a video phone.

According to embodiments of the present invention, the sending device is selected from the group consisting of a telephone, a computing device, a digital telephone adapted to provide voice over IP, a digital telephone adapted to provide voice over a packet switched network, a personal data assistance, a cell phone, a radio phone, a video phone a switch, a router, a proxy server, and a PBX.

In still another embodiment of the present invention, the system further comprises a second network. According to this embodiment, the sending device associates a user address with the user identifier, and routes communications addressed to the user address to the address of the receiving device via the second network.

According to embodiments of the present invention, the second network is selected from the group consisting of a wired network, wireless network, a fiber network, hybrid fiber coax network, a switched network, a packet-based network, a cable network, a public switched telephone network, and the Internet.

In an embodiment of the present invention, a system for obtaining status of a receiving device over a network comprises equipment that provides output signals indicative of the status of the receiving device, a datastore, a receiving device monitor, a status file, a first network, a second network, and a sending device. The receiving device comprises an address for receiving communications. By way of illustration and not as a limitation, the receiving device may be a telephone, and wherein the signals indicative of the status of the receiving device comprises off-hook signals from the telephone if the telephone is off-hook. In this embodiment, the user address and the receiving device address are telephone numbers. However, this is not meant as a limitation. Other addressing systems may be used without departing from the scope of the present invention.

The datastore comprises a user identifier associated with a user address. The receiving device monitor provides state data indicative of a state of the receiving device and provides proximity data indicative of a potential user being within a preset access distance of the receiving device to receive communications from the sending device. The proximity data comprises a user identifier associated with the potential user. The status file is connected to the equipment and to the first network and receives the output signals from the state data and proximity data from the receiving device monitor. The sending device is connected to the first network and the second network and accesses the status file over the first network and obtains the state data and the proximity data of the receiving device. By way of illustration and not as a limitation, the status file comprises the off-hook status of a telephone if the of telephone is off hook and the on-hook status of a telephone if the telephone is on-hook. Using the user identifier, the receiving device monitor obtains a user address and routes communications addressed to the user address to the receiving device address via the second network.

According to embodiments of the present invention, the first and second networks are selected from the group consisting of a wired network, wireless network, a fiber network, hybrid fiber coax network, a switched network, a packet-based network, a cable network, a public switched telephone network, and the Internet. According to other embodiments of the present invention, the receiving device is selected from the group consisting of a telephone, a computing device, adapted to provide voice over IP, a digital telephone adapted to provide voice over a packet switched network, a personal data assistance, a cell phone, a radio phone, and a video phone.

According to embodiments of the present invention, the sending device is selected from the group consisting of a telephone, a computing device, a adapted to provide voice over W, a digital telephone adapted to provide voice over a packet switched network, a personal data assistance, a cell phone, a radio phone, a video phone, a switch, a router, a proxy server, and a PBX.

In still another embodiment of the present invention, the system further comprises a second network. According to this embodiment, the sending device associates a user address with the user identifier, and routes communications addressed to the user address to the address of the receiving device via the second network.

According to embodiments of the present invention, the second network is selected from the group consisting of a wired network, wireless network, a fiber network, hybrid fiber coax network, a switched network, a packet-based network, a cable network, a public switched telephone network, and the Internet.

In an embodiment of the present invention, a system for obtaining status of a receiving device over a network comprises the receiving device, a datastore, an RFID tag comprising an RFID tag identifier that is associated with the user identifier, a receiving device state monitor that provides state data indicative of a state of the receiving device, an RFID monitor that provides proximity data indicative of the RFID tag being located within a preset access distance of the receiving device, and wherein the proximity data comprises the REID tag identifier, a status file that receives device state data and proximity data, a first network, a second network.

In an embodiment of the present invention, the receiving device comprises a receiving device address and is adapted to receive communications from a sending device, the datastore comprises a user identifier, and proximity data comprises a user identifier of a potential user of the receiving device. The sending device accesses the status file over the first network, obtains the state data and the proximity data of the receiving device, using the REID identifier, obtains the user identifier and the user address, and routes communications addressed to the user address to the receiving device address via the second network. In yet another embodiment of the present invention, the REID monitor determines the presence of an REID tag within the preset distance of the receiving device and provides the proximity.

DETAILED DESCRIPTION

The present invention is a system and method for obtaining the telephone status (on-hook/off-hook) of a called party's telephone over a network external to the location of the called party's telephone, such as the Internet.

Figure 1:
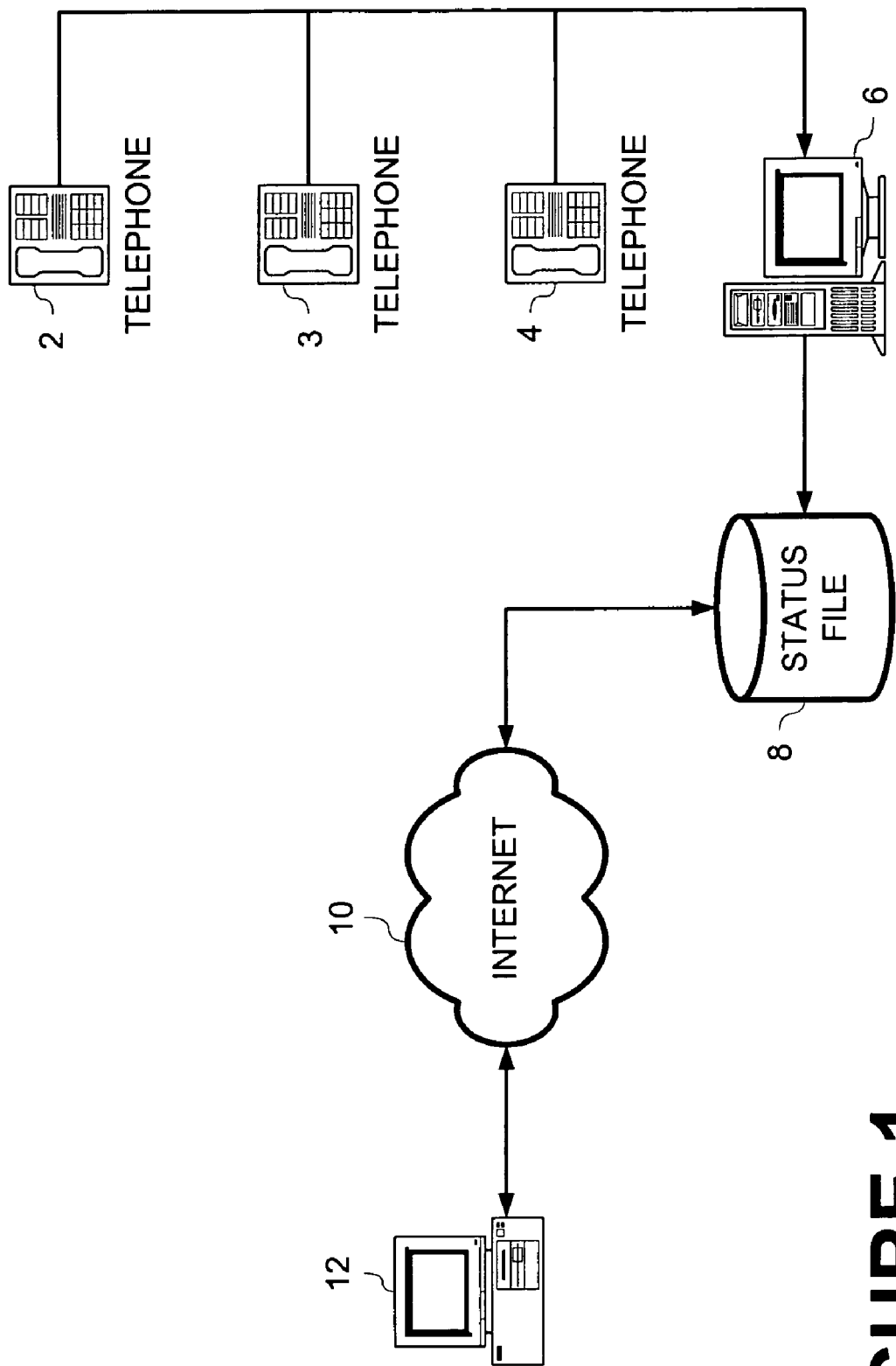
FIG. 1 illustrates the basic architecture of the telephone status monitor according to an embodiment of the present invention.

Referring to FIG. 1, the general architecture of the telephone status monitor is described. Using a personal computer or other similar type of processor 12 a user accesses a network, in this case the Internet 10, although this is not meant as a limitation. Any network that can be connected to a calling party and a called party can also be used. The calling party accesses the telephone status file 8 which is continually updated by a telephone status monitor 6 which constantly monitors a series of telephones 2, 4. It should be noted that it is anticipated that many thousands of telephones will be monitored in this fashion. Eventually it is anticipated that millions of phones will be so monitored. The monitoring function can be accomplished by special equipment for that purpose or is simply the output of a switch that recognizes when a particular telephone is off-hook on the network.

The status file 8 is continually updated by monitor 6 with the on-hook or off-hook status of telephones that are monitored. Thus, the calling party communicating with a PC 12 can receive "real time" status (as determined by the sampling rate of the monitor) of a telephone being called by simply monitoring the telephone status file that is accessible over the Internet.

Since the status file is anticipated to contain many thousands of numbers it is anticipated as past of the present invention that when a calling party using its PC 12 requests the status of a particular telephone that only the status of that telephone will subsequently be displayed on the user PC. Alternatively, the user PC 12 may create a list of numbers to monitor and have the data "pushed" over the Internet 10 to the calling party's PC 12.

Figure 2:
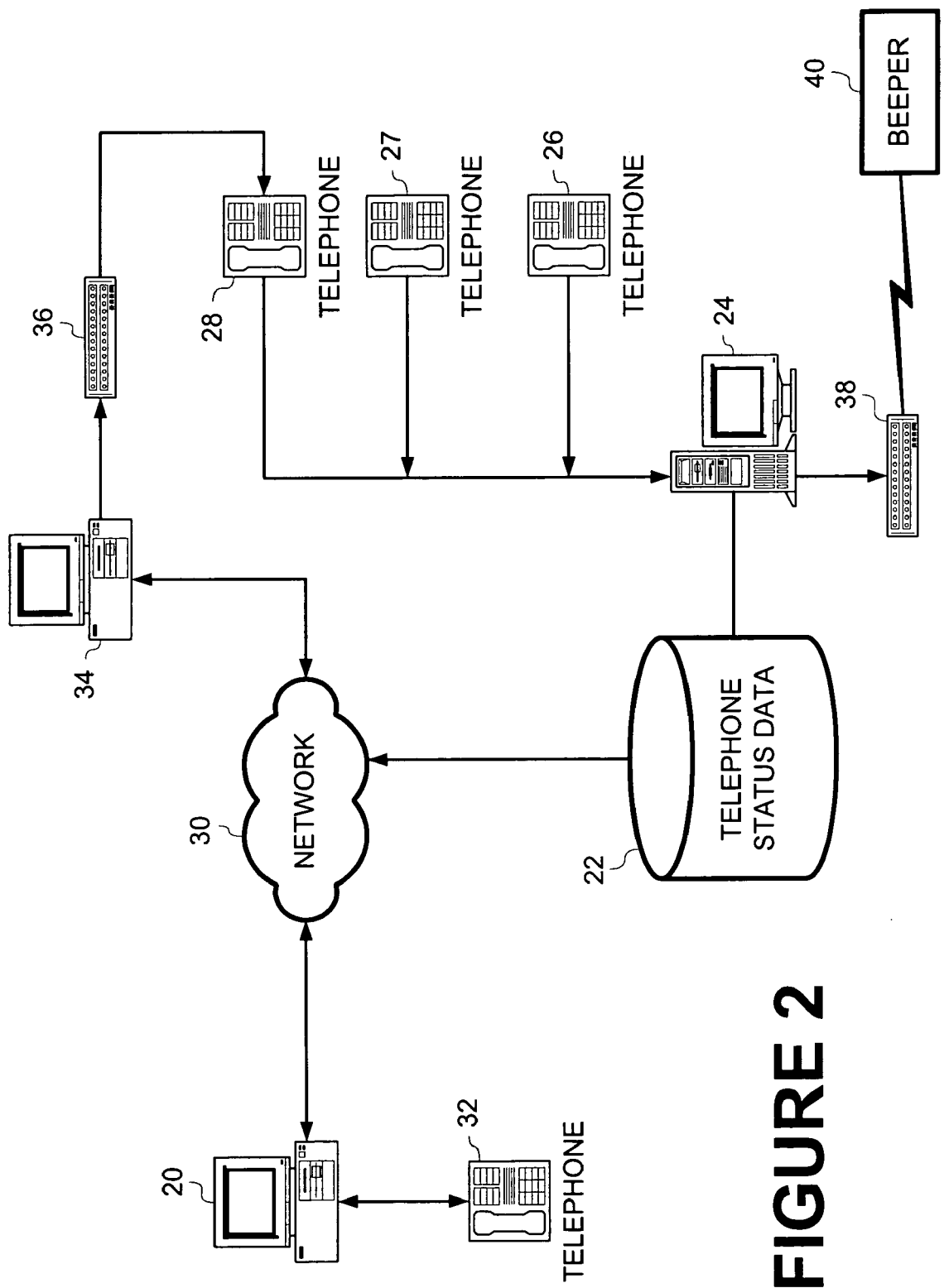
FIG. 2 illustrates an alternate embodiment of the telephone status monitor according to an embodiment of the present invention.

Referring to FIG. 2, an alternate embodiment of the present invention is shown. In this case, calling party's PC 20 accesses the telephone status file 22 over the Internet 30. Again, the telephone status file 22 is continually updated by a telephone status monitor 24 which monitors telephones 26 and 28 (again these are representative of a plurality of telephones fully monitored by the system). In this case, however, the calling party has a telephone 32 that is connected to the calling party's PC 20. When the calling party's PC 20 monitors the status of a called party via the status file 22 as soon as the called party status indicates an on-hook condition, the PC 20 will then place a telephone call to the called party. This makes the entire connection process an automated one. This embodiment finds particular utility in a private branch exchange (PBX) where a telco switch is ordinarily not monitoring individual telephones.

Although the invention may be embodied so as to monitor status any type of telephone, it has particular value for monitoring the status of ordinary telephones on the plain old telephone system (i.e., POTS telephones). That is because the POTS does not have the sort of telephone status monitoring features that may be included in newer generations of telephone networks.

Referring again to FIG. 2, the calling party may also send an e-mail to the called party's PC 34. The e-mail is converted from text to digital voice at converter 36 and routed to the voice mail box 36 of the called party.

Referring again to FIG. 2, if the calling party must be away from the telephone yet still wants to know when a called party is available for a telephone call, the present invention also comprises a "Beeper" capability 38 to send a message to a beeper 40 of the calling party notifying the calling party that the called party is available for a telephone call.

Figure 3:
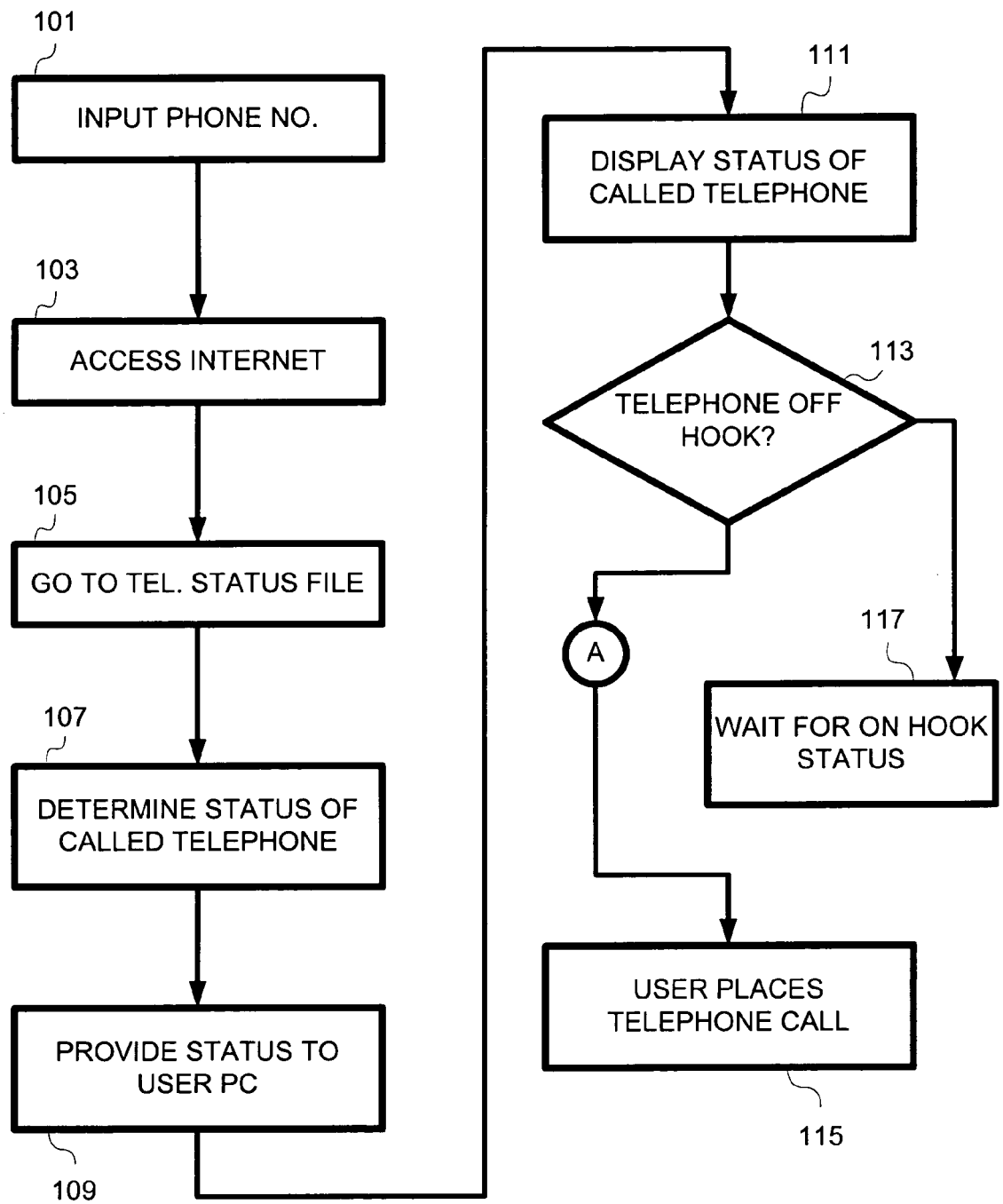
FIG. 3 illustrates a process of the telephone status monitor according to an embodiment of the present invention.

Referring to FIG. 3, the flow of the method of the present invention is shown. A calling party having a PC inputs a telephone number to be called (the called party) 101. Thereafter, the calling party's PC connects to the Internet 103 subsequently accesses the telephone status file 105. The status of the called party s telephone number is then determined 107 and that status is provided back to the calling party's PC 109 noting that status of the called party's telephone line.

Upon receipt of the called party's status, that information is displayed for the calling party 111 and thereafter, if the called party's telephone line status is in an on-hook condition 113, the calling party can then call the called party 115. Otherwise, the calling party simply waits for an on-hook condition to be sensed 117.

Figure 4:
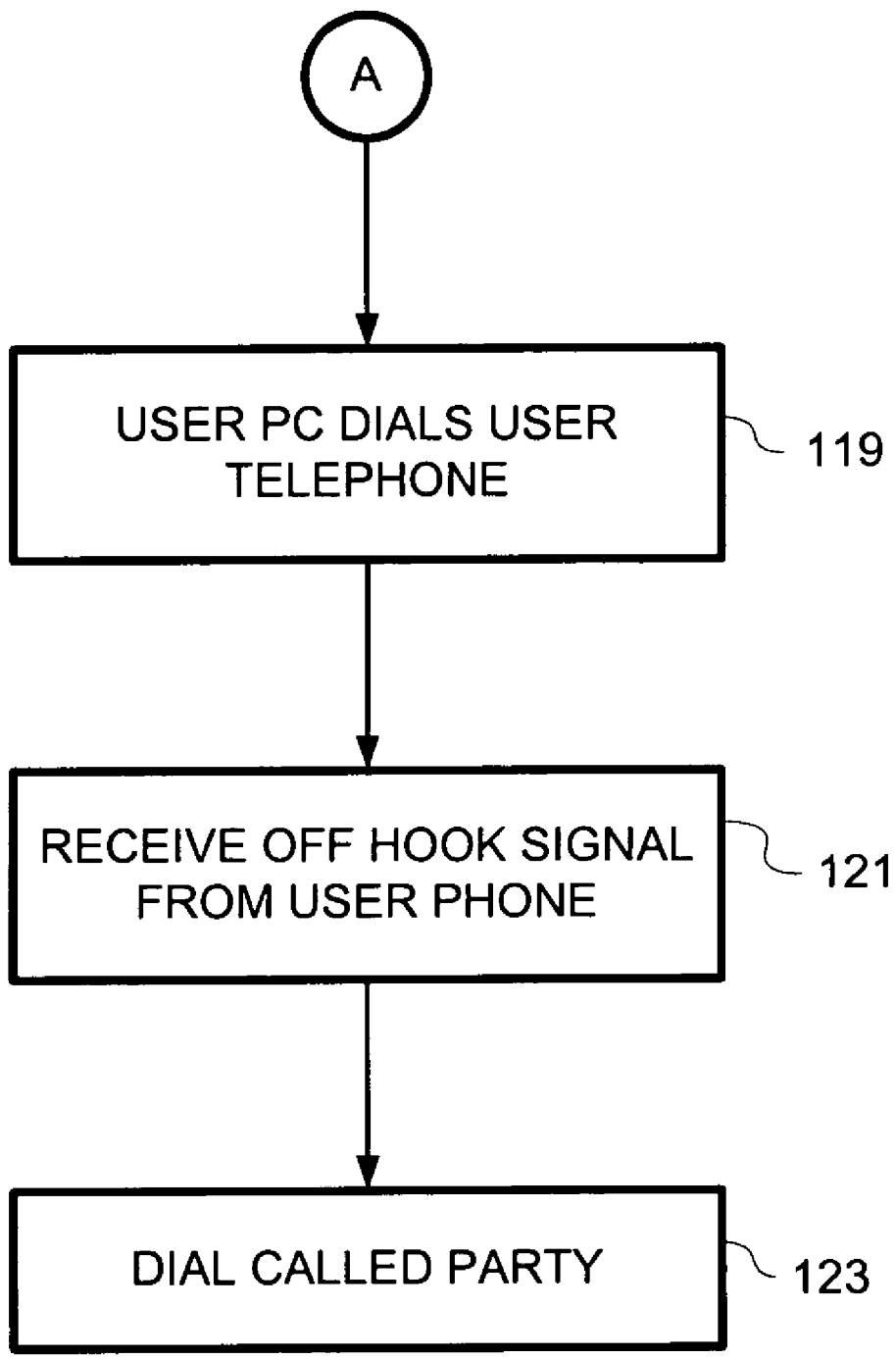
FIG. 4 illustrates an alternate embodiment of the process of the telephone status monitor according to an embodiment of the present invention.

Referring to FIG. 4, an alternate embodiment of the present invention is shown. All of the steps of the access to the status of the called party's telephone line is the same is noted previously in FIG. 3. However, instead of the user making the telephone call, the PC continually monitors the telephone status file. Upon noting that the called party's telephone status is in an on-hook condition, the calling party's PC dials the called party's telephone 119. The calling party's PC then waits to receive an on-hook signal from the called party's telephone 121, thereby signaling that the calling party is on the telephone ready to make the telephone call. The calling party's PC then places the telephone call to the called party's telephone 123, thereby completing the telephone call. It should be noted that at the present time it is possible to place a telephone call over the Internet. Therefore, the calling party's PC can place the call over the Internet to a called party's telephone or, in the alternative, the calling party's PC can simply place a call over the public switch telephone network to the called party's telephone.

Figure 5:
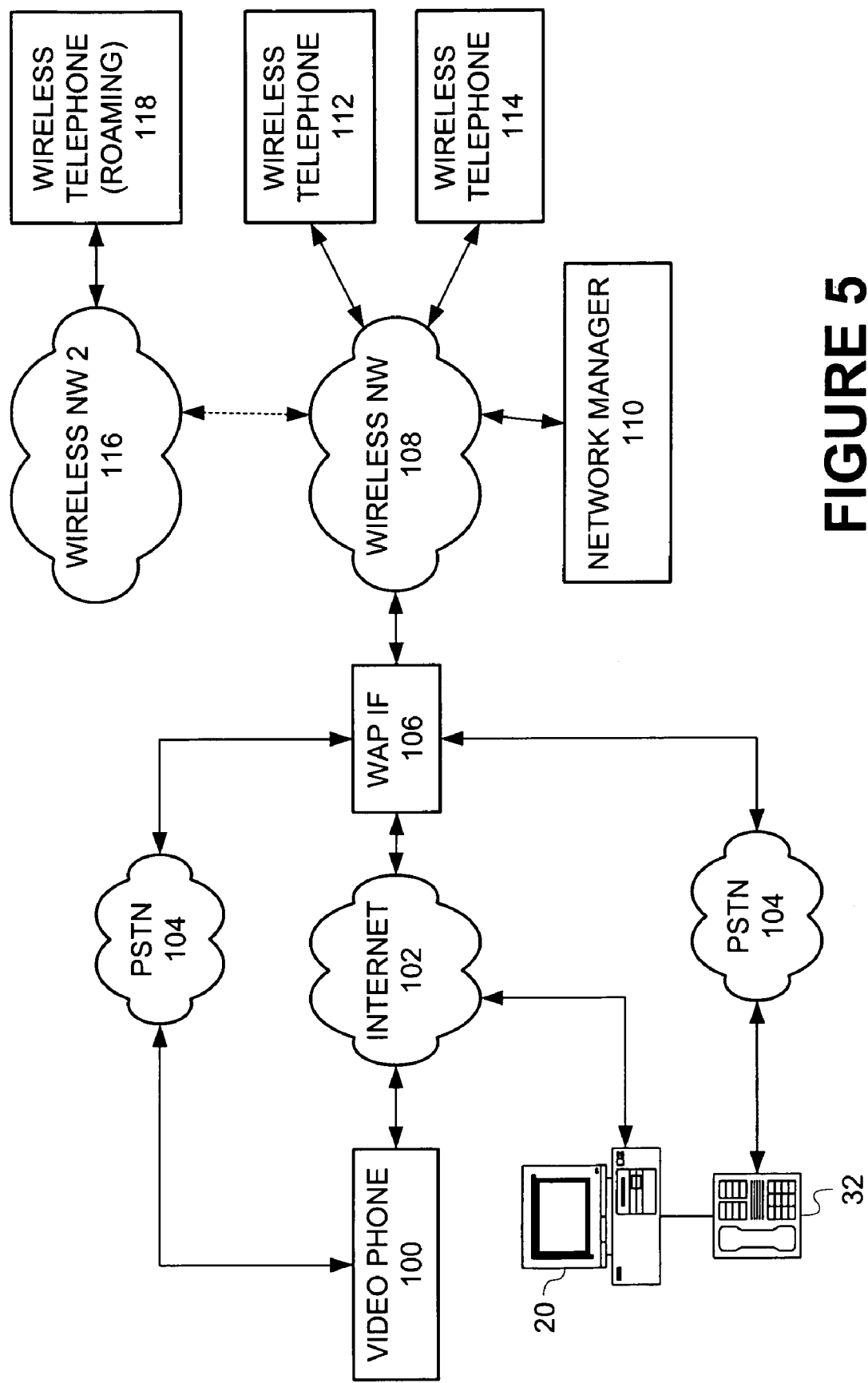
FIG. 5 illustrates an alternate embodiment using cable infrastructure according to an embodiment of the present invention.

Referring to FIG. 5, an alternative embodiment of the present invention is illustrated. While it is important for long-distance callers to be able to ascertain whether the party is online or not, this is also particularly important when one is dealing with wireless communications. For example, and as described earlier, personal computer 20 can connect to, for example, the Internet 102 to ascertain the status of wireless telephones 112, 114, and 118. The query concerning the telephone status then proceeds through a wireless application protocol (WAP) interface 106 to wireless network 108. The request then flows to the wireless network manager 110 which records which wireless phones are currently available on the network and, of key importance, which of those telephones is engaged in an active telephone call. Thus network manager knows that wireless telephones 112 and 114 are available for telephone calls or in the alternative that, for example, wireless telephone 114 is engaged in an active phone call. This information is then sent by network manager 110 over wireless network 108 through WAP interface 106 through Internet 102 to PC 20. At that point the user can decide to make a telephone call using conventional telephone 32 over the public switch telephone network 104 through the WAP interface 106 over wireless network 108 to the wireless telephones 112, 114. Alternatively, telephone 32 can place its call through PC 20 via Internet telephony over the Internet 102 to the wireless telephones 112, 114.

This knowledge of the status of telephones in a wireless system is particularly important, since certain trends exist to charge only the caller for calls that are to be made to or from a wireless network. This is consistent with the current method of charging for telephone calls over a public switch telephone network. Thus, in a situation where a caller is charged for all telephone calls made, it will be particularly important to the caller that it not get charged for leaving a message over a wireless network which tends to be particularly expensive.

The expense in dealing with a wireless network is all the more apparent when one considers that a telephone may be in a "roaming" mode where the telephone is in a network which is not the home network for the wireless telephone. Thus, in the case where wireless telephone 118 is roaming in a second wireless network 116, a telephone call that is not completed or wherein a message is simply left, becomes all the more expensive since roaming charges will be charged to the caller as well.

Figure 6:
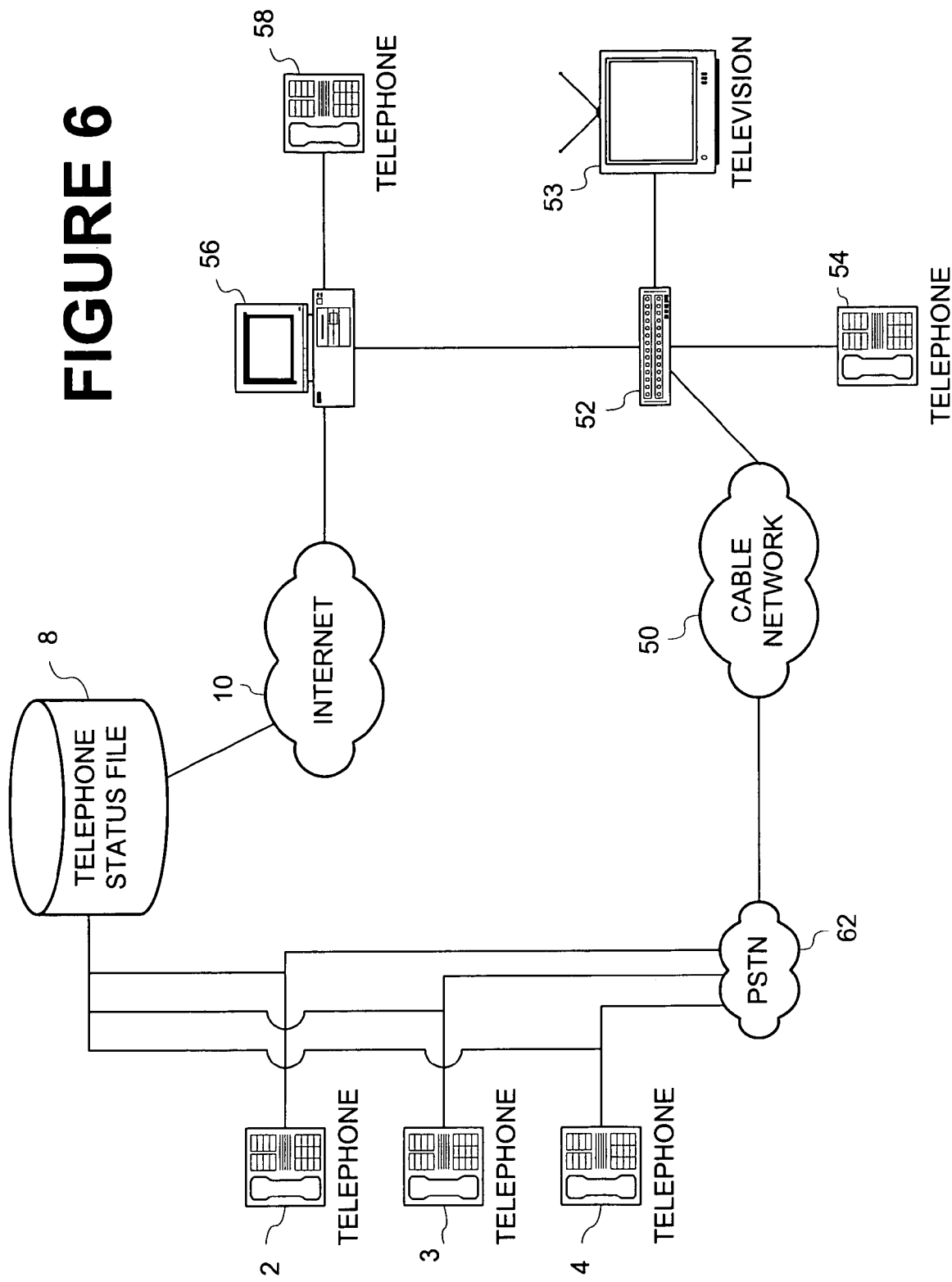
FIG. 6 illustrates a telephone status monitor system embodiment using wireless network components.

Referring to FIG. 6, an alternative embodiment of the present invention using cable network services is shown. In this instance, the calling party is connected to cable service for voice and data services. The cable operator 50 is connected to the Internet using known cable-to-Internet connections. The set-top box at a calling party's location 52 is remotely connected to a cable operations center 50. Naturally, a television 53 is connected to the set-top box 52. In one embodiment, a calling party's telephone 54 is directly connected to be set-top box 52 where telephone service is offered over a cable network. In addition, however, the calling party's computer 56 can also be connected to the cable set-top box 52 and, using the access to the Internet 10 obtain the status of a remote telephone 2, 3, 4 via information in the telephone status file 8. The connection of the cable system can also be through any other voice/data interface provided by the cable carrier since set top boxes will not be the only interface to voice and data services over cable. If a calling party has a telephone 58 connected to the calling party's computer, upon obtaining a status indicating that a called party's telephone is available, calling party telephone 58 can make a telephone calls through the calling party's computer 56 through the set-top box (or other interface) 52 through the cable operations center 50 via the telephone company 60 over the normal public switched telephone network 62 to the called party's telephone 2, 3 or 4.

Alternatively, where Internet telephone service is available and the calling party, via the computer 56 determines that a remote telephone is available, a calling party places a telephone call over the Internet via the calling party's telephone 58 through the calling party's computer 56 through the set-top box (or other interface) 52 to cable operator 50 through the Internet 10 via a computer at the called party's location 6 to the called party's telephone 2, 3, or 4.

Figure 7:
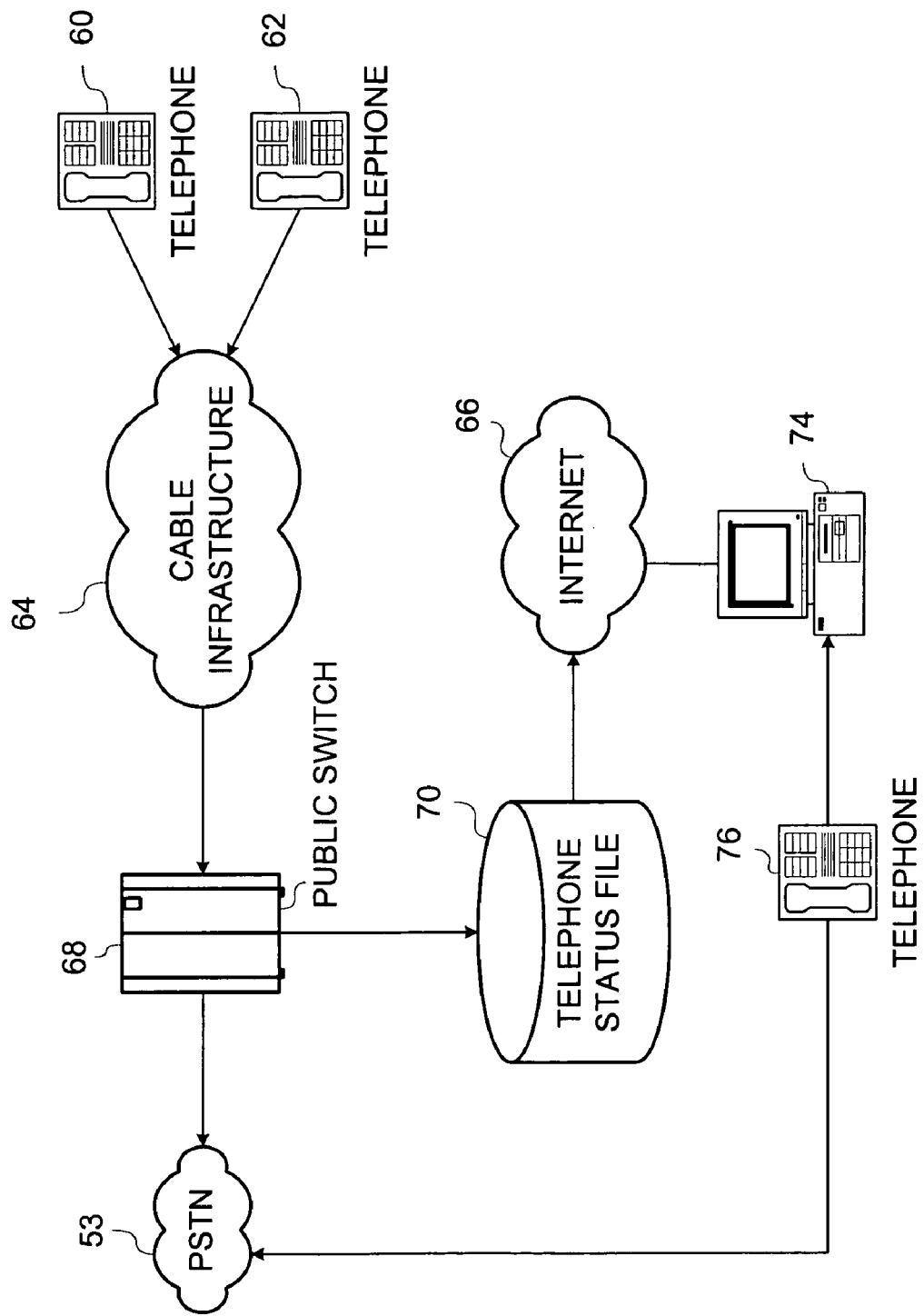
FIG. 7 illustrates a cable infrastructure embodiment with telephone status provided over the cable infrastructure according to an embodiment of the present invention.

Referring to FIG. 7 a cable infrastructure embodiment of the present invention is illustrated. Telephone 60, 62 are connect to a residential telephone service provided over a cable infrastructure. As noted above it is a growing trend in the current telecommunications market for telephone companies to merge with or acquire cable networks in order to provide local and long distance services over cable instead of over normal telephone wires.

When, for example, telephone 60 is making a call over cable infrastructure 64, the telephone call ultimately goes through some form of switch 68, and then to the public switched telephone network 72 for routing to its ultimate destination by known networks and means.

Switch 68, having knowledge of the off hook status of telephone 60, provides that status to telephone status file 70 which is accessible over the Internet 66.

A calling party having a computer 74 can then access the Internet 66 to gain access to the telephone status file 70 thereby determining if user 60 is on the line or not.

Once the calling party determines that the called party telephone 60 is not off hook, a call can be made from the calling party telephone 76 over PSTN 72 to the called party 60. Alternatively, the calling party can place an Internet telephone call to the third party if the called party has this capability.

Thus it can be seen that the telephone status file can be accessed over those cable systems that are linked to the normal telephone company long distance operations.

A telephone line status monitoring system and method has been described herein. It will be appreciated by those skilled in the art that minor modifications to the present invention could be made without departing from the scope of the invention as disclosed. For example, it is also possible with the system of the present invention to monitor temperature of the home. In this instance, the system has a thermostat in place of the telephone system. The thermostat places its readings into a file over the Internet which can be read by a user when the user is at a remote location. In this manner the user can monitor home temperature during absences.

Similarly, just as messages can be transmitted to the user of the telephone, so can instructions to raise or lower temperature in the home be transmitted to the thermostat over the Internet.

Alarm monitoring can also be accomplished using the system and method of the present invention. In this instance, when an alarm goes off, the alarm company can be notified in the normal fashion. However, the alarm could also be noted in a file to be reviewed by a user when the user is away from the premises. In this case the user will know an alarm has gone off and can contact the alarm company to ascertain the meaning of the alarm.

An additional embodiment of the alarm concept of the present invention is for a formatted email to be sent to the owner of the premises so that the owner can have more specific notification of the meaning of any alarm that goes off. Thus it can be seen that the telephone status file can be accessed over those cable systems that are linked to the normal telephone company long distance operations.

Figure 8:
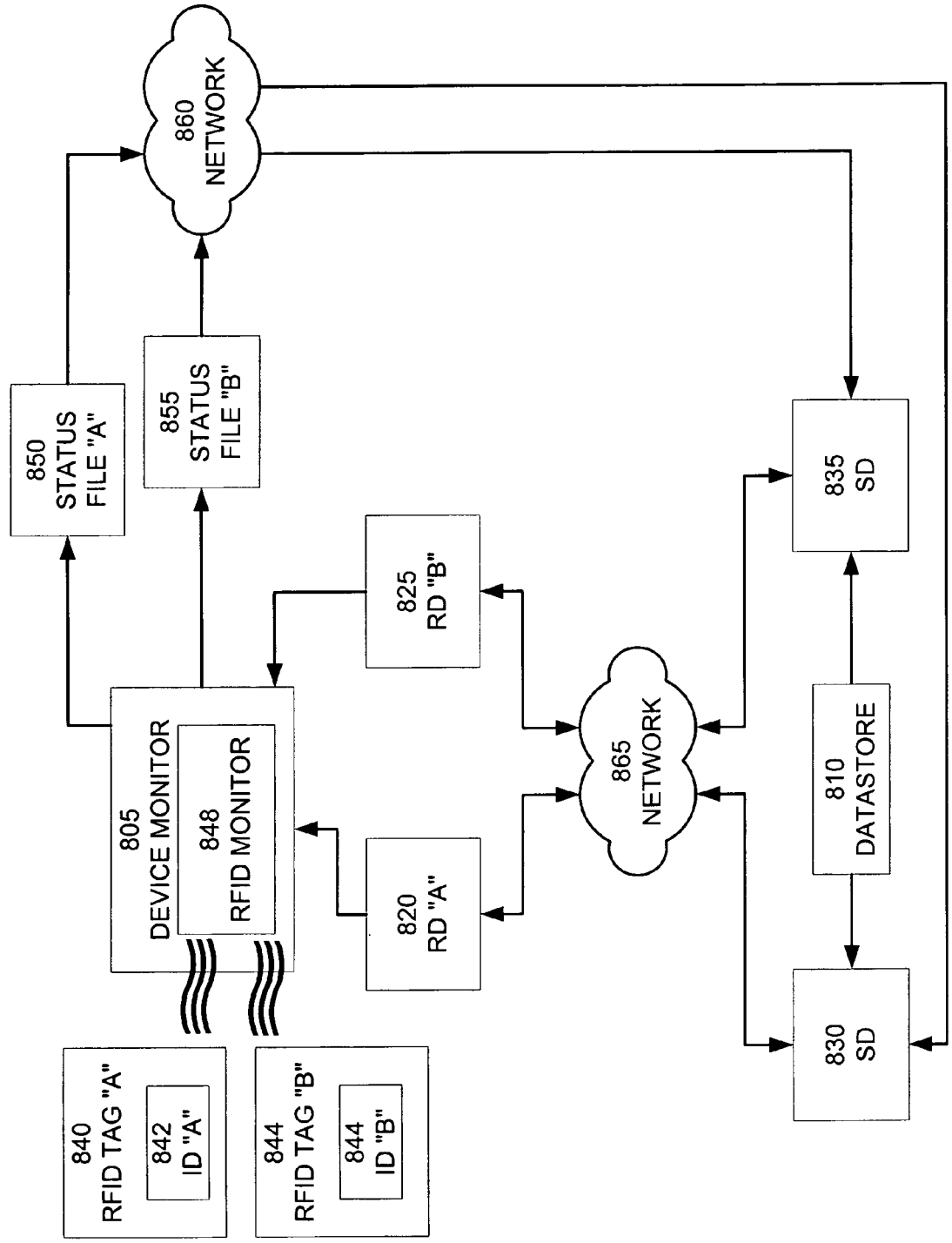
FIG. 8 illustrates the logical elements of a status monitoring system utilizing an RFID tag according to embodiments of the present invention.

FIG. 8 illustrates the logical elements of a status monitoring system utilizing an RFID tag according to embodiments of the present invention. Referring to FIG. 8, a device monitor 805 monitors the status of receiving devices RD "A" 820 and RD "B" 825. RD "A" 820 and RD "B" 825 each comprise an unique address. Device monitor 805 creates status file "A" 850 comprising the status of RD "A" 820 and status file "B" 855 comprising the status of RD "B" 825. These status files are available over network 860 sending devices 830 and 835. Sending devices 830 and 835 select a receiving device (RD "A" 820 and/or RD "B" 825) to communicate with using the address of the selected receiving device. Communications are established via network 865.

In an embodiment of the present invention, receiving devices RD "A" 820 and RD "B" 825 are telephones and the addresses are telephone numbers. As previously described, the status of a telephone receiving device comprises the "on-hook" or "off-hook" state of the receiving device and other information about the state of the device that would be useful to a sending device. By way of illustration and not as a limitation, the status may include whether the device is forwarded, the number of rings before the device is answered by an automated answering device, and similar state information.

As will be appreciated by those skilled in the art, communications may be established between other sending devices and receiving devices without departing from the scope of the present invention. By way of illustration and not as a limitation, receiving devices and sending devices may be a computing device, a digital telephone providing voice over IP, a personal data assistance, a cell phone, a radio phone, a video phone, and the like. Additionally, sending devices may be switches, routers, proxy servers and other devices that broker communications between receiving devices and other sending devices.

The status of a receiving device is directly related to the media the receiving device uses for communication, the type of communications the receiving device receives, and the functionality that is embodied in the receiving device. By way of illustration, if the receiving device is an IP networked device, the status comprises the IP address of the receiving device, port information, firewall information, and network address translation information.

Networks 860 and 865 may be wired, wireless, fiber, hybrid fiber coax, switched, packet-based, and combinations of the same. Additionally, networks 860 and 865 may be the same or different media. In an exemplary embodiment, network 860 is the Internet. In another exemplary embodiment, network 865 is a telephone network.

In an exemplary embodiment of the present invention, the status of a receiving device further comprises a recipient list of users able to use the receiving device at any particular time. In this exemplary embodiment, the recipient list is created by the receiving device in response to the detection of a qualified user within a preset access distance of the receiving device. A sending device may access this status information and determine how to communicate with a user on the recipient list.

Referring again to FIG. 8, device monitor 805 further comprises an RFID monitor 848 that may communicate with RFID tag "A" 840 and RFID tag "B" 844. In the embodiment illustrated in FIG. 8, RFID tags 840 and 844 are passive devices. However, the present invention is not so limited. Semi-passive or active RFID tags may be utilized without departing from the scope of the present invention. Additionally, RFID tags 840 and 844 comprise memory (not illustrated) in which RFID identifier "A" 842 and RFID identifier "B" 846 are stored. The memory may be either a read only memory or programmable read/write memory.

RFID monitor 848 polls RFID tag "A" 840 and RFID tag "B" 844. An RFID tag within a preset distance of RFID monitor 848 will respond with a reflected signal comprising an RFID identifier of the responding tag. If RFID tag "A" 840 responds to the poll from RFID monitor 848, RFID monitor 848 will receive RFID identifier "A" 842. If RFID tag "B" 844 responds to the poll from RFID monitor 848, RFID monitor 848 will receive RFID identifier "B" 846. If both tags respond to the poll, RFID monitor 848 will received both RFID identifier "A" 842 and RFID identifier "B" 846. The RFID identifiers are then added to the appropriate receiving device status file.

Both sending devices 830 and 835 have access to the receiving device status files (850 and 855) and to datastore 810. Datastore 810 maps an RFID identifier in a receiving device status file to an address associated with a user and to an address of the receiving device associated with the receiving device status file. Thus, a sending device "knows" at a point in time (determined by the polling rate of RFID monitor 848) that a user is within a preset proximity to a receiving device. A communication directed to that user's address may then be directed to the address of that receiving device.

In an alternate embodiment of the present invention, access to the status information of a receiving device is limited to a sending device or a sender that has been pre-qualified to access that status information. The identity of the sending device or caller is established using the address of the sending device or an identifier of the sender. By way of illustration and not as a limitation, a sending device may be identified by its network address or MAC address and a sender may be identified by his or her telephone number, e-mail address, or SIP address. In yet another embodiment of the present invention, the sender may be prompted for a user ID.

As will be appreciated by those skilled in the art, the status monitoring system illustrated in FIG. 8 and described above may be used in many applications. By way of illustration and not as a limitation, in an embodiment of the present invention, a status monitoring system monitors a telephone system. In this embodiment, the telephone system may be operated within an office, a hotel, a hospital, a home, an airport, and similar environments. The system may comprise a single location or multiple locations.

In this embodiment, a sending device (830) is a switching device that receives a call from a calling party directed to a called party using the called party's telephone number. The called party is assigned to RD "A" 820 and RFID tag "A" 840. Sending device 830 checks status file "A" 850 and determines that the called party is not in proximity to the RD "A" 820. Sending device 830 then checks the status files of all other receiving devices on the network to determine whether the called party is in proximity to any other receiving device. In this example, ID "A" 842 associated with RFID tag "A" 840 assigned to the called party is located in status file "B" 855 indicating that the called party is in proximity to RD "B" 825. Send device 830 redirects the call to RD "B" 825 and the parties are connected.

Figure 9:
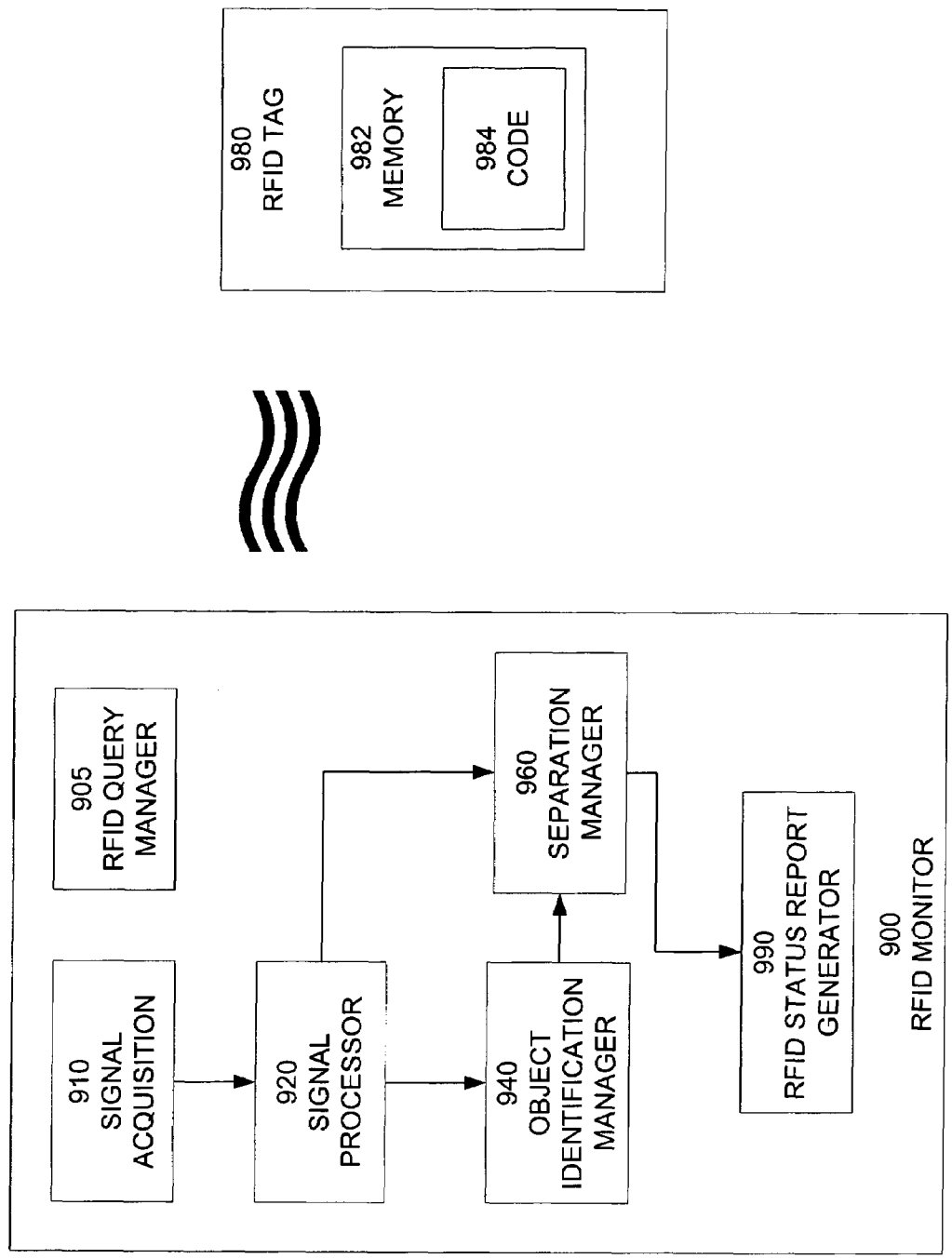
FIG. 9 illustrates the components of an RFID monitor according to an embodiment of the present invention.

FIG. 9 illustrates the components of an RFID monitor according to an embodiment of the present invention.

Referring to FIG. 9, an RFID monitor 900 comprises a signal acquisition element 910, a signal processor 920, an object identification manager 940, a separation manager 960, an RFID status report generator 990, and an RFID tag query manager 905.

RFID query manager 905 sends a query signal during a preset time period. In another embodiment of the present invention, the power of the query signal sent by query manager 905 may be adjusted. The query signal is received by an RFID tag 980 and reflected back to alert module 900. The reflected signal comprises the code 982 stored in memory 984. Signal acquisition element 910 receives the reflected signal emitted by RFID tag 980. The signal acquisition element 910 comprises a device or devices appropriated to receive the signal generated by RFID tag 980. In an embodiment of the present invention, the sensitivity of the signal acquisition element 910 may be adjusted. The reflected signal from the signal acquisition element 910 is received and processed by signal processor 920. The processed signal is sent from signal processor 920 to an object identification manager 940 to obtain the RFID tag code 984. The signal is also provided to separation manager 960 to determine if the distance between the RFID monitor 900 and the RFID tag 980 exceeds a preset separation distance.

If the preset separation distance is not exceeded, the separation manager 960 sends "present" signal to RFID status report generator 990 indicative of the proximity of RFID tag 980 to the receiving device being monitored. RFID status report generator 990 will send a status report to the status file (see FIG. 8, 850 or 855) of the receiving device being monitored reporting the proximity of RFID tag 980 with RFID tag code 984 in proximity to that receiving device.

If the preset separation distance is exceeded, the separation manager 960 will take no action. In this case, RFID status report generator 990 will not receive a "present" signal. If RFID report generator 990 has previously received a "present" signal relating to RFID tag 980, then RFID status report generator 990 will send a new RFID status to the appropriate status file removing RFID tag 980 with RFID code 984 from the list of RFID tags in proximity to the receiving device being monitored. In an embodiment of the present invention, RFID status report generator 990 waits a number of polling cycles in which the preset separation distance between RFID monitor 900 and RFID tag 980 is determined to have been exceed before removing RFID tag 980 from the list of RFID tags in proximity to the receiving device being monitored.

In one embodiment of the present invention, separation manager 960 determines that the preset separation distance has been exceeded based on a lack of a reflected signal from RFID tag 980.

In another embodiment, separation manager 960 uses the signal strength of the reflected signal to determine that the preset separation distance has been exceeded. In conjunction with the variable power of the query signal emitted by query manager 905 and the variable sensitivity of the signal acquisition element 910, the separation distance threshold may be adjusted. As will be appreciated by those skilled in the art, that other means may be used to determine that the preset separation distance has been exceeded without departing from the scope of the present invention.

The monitoring system and method of the present invention also contributes to the changing environment of office "hoteling" wherein multiple workers, each of whom may telecommute, may use the same office when they are present at different times in the physical location of their organization. In this manner, a worker can check into the office to be used and, via the present invention, have calls routed to that office and have appropriate computer access to files based on the status of the receiving device in that office (i.e telephone, computer, fax machine, PDA, cell Phone). As a user's profile status changes, regardless of where the worker resides in a vacant or temporarily assigned office, the permissions for file access and telephone routing will be enabled and be appropriate to the permission level of that worker.

A status monitoring system and method has been described herein. It will be appreciated by those skilled in the art that minor modifications to the present invention could be made without departing from the scope of the invention as disclosed. For example, it is also possible with the system of the present invention to monitor temperature of the home. In this instance, the system has a thermostat in place of the telephone system. The thermostat places its readings into a file over the Internet which can be read by a user when the user is at a remote location. In this manner the user can monitor home temperature during absences.

Similarly, just as messages can be transmitted to the user of the telephone, so can instructions to raise or lower temperature in the home be transmitted to the thermostat over the Internet.

Alarm monitoring can also be accomplished using the system and method of the present invention. In this instance, when an alarm goes off, the alarm company can be notified in the normal fashion. However, the alarm could also be noted in a file to be reviewed by a user when the user is away from the premises. In this case the user will know an alarm has gone off and can contact the alarm company to ascertain the meaning of the alarm.

An additional embodiment of the alarm concept of the present invention is for a formatted email to be sent to the owner of the premises so that the owner can have more specific notification of the meaning of any alarm that goes off.

A telephone status monitoring system and method has now been shown. It will be apparent to those skilled in the art that the present invention may be modified in numerous ways and may assume many embodiments other than those specifically set out and described above without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

We claim:

1. A system for obtaining status of a receiving device over a network comprising:
   equipment adapted to provide output signals indicative of the status of the receiving device, wherein the receiving device comprises an address for receiving communications;
   a status file connected to the equipment for receiving the output signals from the equipment;
   a first network connected to the status file;
   a sending device connected to the first network, the sending device comprising instructions for accessing the status file over the first network, and for obtaining the status of the receiving device, wherein the status comprises a user identifier of a potential user of the receiving device determined to be within a preset access distance of the receiving device.

2. The system of claim 1, wherein the receiving device comprises a telephone, and wherein the signals indicative of the status of the receiving device comprises off-hook signals from the telephone if the telephone is off-hook.

3. The system of claim 2, wherein the status file comprises the off-hook status of the telephone if the of telephone is off hook.

4. The system of claim 1, wherein the receiving device comprises a telephone, and wherein the signals indicative of the status of the receiving device comprises on-hook signals from the telephone if the telephone is on-hook.

5. The system of claim 4, wherein the status file comprises the on-hook status of the telephone if the of telephone is on-hook.

6. The system of claim 1, wherein the first network is selected from the group consisting of a wired network, wireless network, a fiber network, hybrid fiber coax network, a switched network, a packet-based network, a cable network, a public switched telephone network, and the Internet.

7. The system of claim 1, wherein the receiving device is selected from the group consisting of a telephone, a computing device, a digital telephone adapted to provide voice over IP, a digital telephone adapted to provide voice over a packet switched network, a personal data assistance, a cell phone, a radio phone, and a video phone.

8. The system of claim 1, wherein a sending device is selected from the group consisting of a telephone, a computing device, a digital telephone adapted to provide voice over IP, a digital telephone adapted to provide voice over a packet switched network, a personal data assistance, a cell phone, a radio phone, a video phone, a switch, a router, a proxy server, and a PBX.

9. The system of claim 1, wherein the system further comprises a second network and wherein the sending device is adapted to:
   associate a user address with the user identifier; and
   route communications addressed to the user address to the address of the receiving device via the second network.

10. The system of claim 9, wherein the second network is selected from the group consisting of a wired network, wireless network, a fiber network, hybrid fiber coax network, a switched network, a packet-based network, a cable network, a public switched telephone network, and the Internet.

11. The system of claim 1, wherein the receiving device is a telephone and the user address and the receiving device address are telephone numbers.

12. A system for determining the status of a receiving device over a network comprising:
   the receiving device, wherein the receiving device comprises a receiving device address, and wherein the receiving device is adapted to receive communications from a sending device;
   a datastore comprising a user identifier associated with a user address;
   a receiving device monitor adapted to:
     provide state data indicative of a state of the receiving device; and
     provide proximity data indicative of a potential user being within a preset access distance of the receiving device, and wherein the proximity data comprises a user identifier associated with the potential user;

a status file adapted to receive the state data and the proximity data from the receiving device monitor;

a first network connected to the status file;

the sending device connected to the first network and a second network, wherein the sending device is adapted to:

access the status file over the first network;

obtain the state data and the proximity data of the receiving device;

using the user identifier, obtain a user address; and route communications addressed to the user address to the receiving device address via the second network.

13. The system of claim 12, wherein the receiving device comprises a telephone, and wherein the signals indicative of the status of the receiving device comprises off-hook signals from the telephone if the telephone is off-hook.

14. The system of claim 13, wherein the status file comprises the off-hook status of the telephone if the of telephone is off hook.

15. The system of claim 12, wherein the receiving device comprises a telephone, and wherein the signals indicative of the status of the receiving device comprises on-hook signals from the telephone if the telephone is on-hook.

16. The system of claim 15, wherein the status file comprises the on-hook status of the telephone if the of telephone is on-hook.

17. The system of claim 1, wherein the first network and second network are selected from the group consisting of a wired network, wireless network, a fiber network, hybrid fiber coax network, a switched network, a packet-based network, a cable network, a public switched telephone network, and the Internet.

18. The system of claim 1, wherein the receiving device is selected from the group consisting of a telephone, computing device, a digital telephone adapted to provide voice over IP, a digital telephone adapted to provide voice over a packet switched network, a personal data assistance, a cell phone, a radio phone, and a video phone.

19. The system of claim 1, wherein a sending device is selected from the group consisting of a telephone, a computing device, a digital telephone adapted to provide voice over IP, a digital telephone adapted to provide voice over a packet switched network, a personal data assistance, a cell phone, a radio phone, a video phone, a switch, a router, a proxy server, and a PBX.

20. The system of claim 1, wherein the receiving device is a telephone and the user address and the receiving device address are telephone numbers.

21. A system for determining the status of a receiving device over a network comprising:

the receiving device, wherein the receiving device comprises a receiving device address, and wherein the receiving device is adapted to receive communications from a sending device;

a datastore comprising a user identifier associated with a user address of a potential user of the receiving device;

an RFID tag comprising an RFID tag identifier that is associated with the user identifier;

a receiving device state monitor adapted to provide state data indicative of a state of the receiving device;

an RFID monitor adapted to provide proximity data indicative of the RFID tag being located within a preset access distance of the receiving device, and wherein the proximity data comprises the RFID tag identifier;

a status file adapted to receive the state data from the receiving device state monitor and the proximity data from the RFID monitor;

a first network connected to the status file;

the sending device connected to the first network and a second network, wherein the sending device is adapted to:

access the status file over the first network;

obtain the state data and the proximity data of the receiving device;

using the RFID identifier, obtain the user identifier, and the user address; and route communications addressed to the user address to the receiving device address via the second network.

22. The system of claim 1, wherein the potential user is associated with an RFID tag, and wherein the system further comprises an RFID monitor adapted to determine a presence of the RFID tag within the present distance of the receiving device.

23. The system of claim 12, wherein the potential user is associated with an RFID tag, wherein the system further comprises and RFID monitor, and wherein the RFID monitor is further adapted to:

determine a presence of the RFID tag within the present distance of the receiving device; and provide the proximity data to the receiving device monitor.

* * * * *